Figure 1:
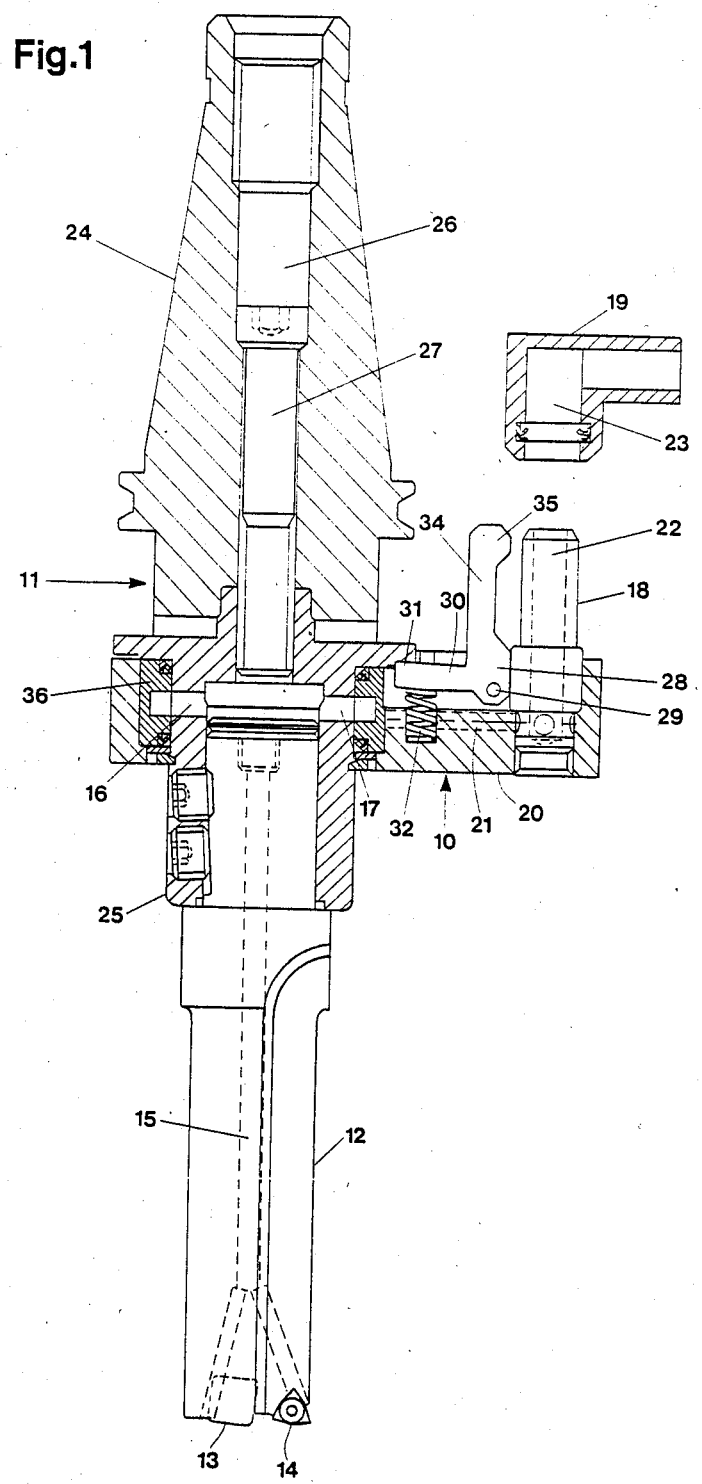

United States Patent [19]

Andersson

[11] Patent Number: 4,573,836

[45] Date of Patent: Mar. 4, 1986

[54] DEVICE FOR TRANSFERRING FLUID TO A ROTATING TOOL HOLDER

[75] Inventor: Kjell Andersson, Fagersta, Sweden

[73] Assignee: Seco Tools AB, Fagersta, Sweden

[21] Appl. No.: 480,479

[22] Filed: Mar. 30, 1983

[30] Foreign Application Priority Data

May 21, 1982 [SE] Sweden ............................. 8203183

[51] Int. Cl.[4] .......................................... B23Q 11/10
[52] U.S. Cl. ...................................... 408/59; 29/568; 408/57
[58] Field of Search ................... 408/56, 57, 58, 59, 408/60, 61; 409/135, 136; 279/20; 29/568, 21 A

[56] References Cited

U.S. PATENT DOCUMENTS

| 3,893,355 | 7/1975 | Maastricht | 409/136 X |
| 4,164,879 | 8/1979 | Martin | 408/56 X |
| 4,293,251 | 10/1981 | Anderson | 408/59 |

FOREIGN PATENT DOCUMENTS

| 0015248 | 9/1980 | European Pat. Off. | 409/135 |
| 0982774 | 3/1974 | Japan | 29/568 |
| 55-15946 | 4/1980 | Japan | 408/59 |
| 0588099 | 1/1978 | U.S.S.R. | 408/56 |

Primary Examiner—Gil Weidenfeld
Assistant Examiner—Glenn L. Webb
Attorney, Agent, or Firm—Burns, Doane, Swecker & Mathis

[57] ABSTRACT

The invention relates to a device for transferring fluid to a rotating holder (11) for a tool (12) for chipforming machining. A locking means (28) is adapted to non-rotatably connect the holder (11) to a housing (20) when the holder (11) is removed from the machine tool, said housing being arranged on the holder (11) and carrying said locking means. For purposes of decreasing the risk that the housing (20) becomes nonuniformly loaded when the holder (11) is connected to the machine tool a locking means (28) is provided which is adapted to release the holder (11) from the housing (20) upon an application of a radially acting force on the locking means (28).

9 Claims, 2 Drawing Figures

DEVICE FOR TRANSFERRING FLUID TO A ROTATING TOOL HOLDER

The present invention relates to a device for transferring fluid, such as cooling or flushing medium, to a rotating holder for a tool for chipforming machining of workpieces, such as a drill, comprising a housing arranged on the holder, said housing comprising a first connecting member intended to, in use, be connected to a second connecting member on a machine tool, said second connecting member communicating with a fluid source, first passage means in said housing for connecting the fluid source with second passage means in the holder, said housing being provided with a locking means which is adapted to non-rotatably interconnect the housing and the holder when the first and second connecting members are moved apart and release the holder from the housing when said first and second connecting members are connected to each other. The invention further relates to a swivel which is especially designed to be used in a device according to the invention.

In previously known devices of the above type the locking means is adapted to be displaced axially against spring action when the connecting members are connected to each other. This means that an axially acting force continuously is applied on the housing during the cutting operation, thus resulting in a nonuniform loading of the housing. Further, the axially acting force requires that the holder has to be journalled in the housing over roller bearings, which means that the housing becomes large and heavy. This fact makes it difficult to use the previously known devices in machines having automatized tool changing systems; in some tool changing systems it might even be impossible to use these devices.

The object of the present invention is to provide a device for transferring fluid of the above type, in which no nonuniform load is applied on the housing when the cutting tool rotates. Another object of the invention is to provide a device which is smaller and lighter than previously known devices.

The above and other objects have been attained by giving the invention the characterizing features stated in the claims following hereinafter.

The invention is described in detail in the following with reference to the accompanying drawings in which one embodiment is shown by way of example. It is to be understood that this embodiment is only illustrative of the invention and that various modifications thereof may be made within the scope of the claims.

In the drawings, FIG. 1 shows the device according to the invention applied in connection with a short hole drill; the device being disconnected from the fluid source.

Figure 2:
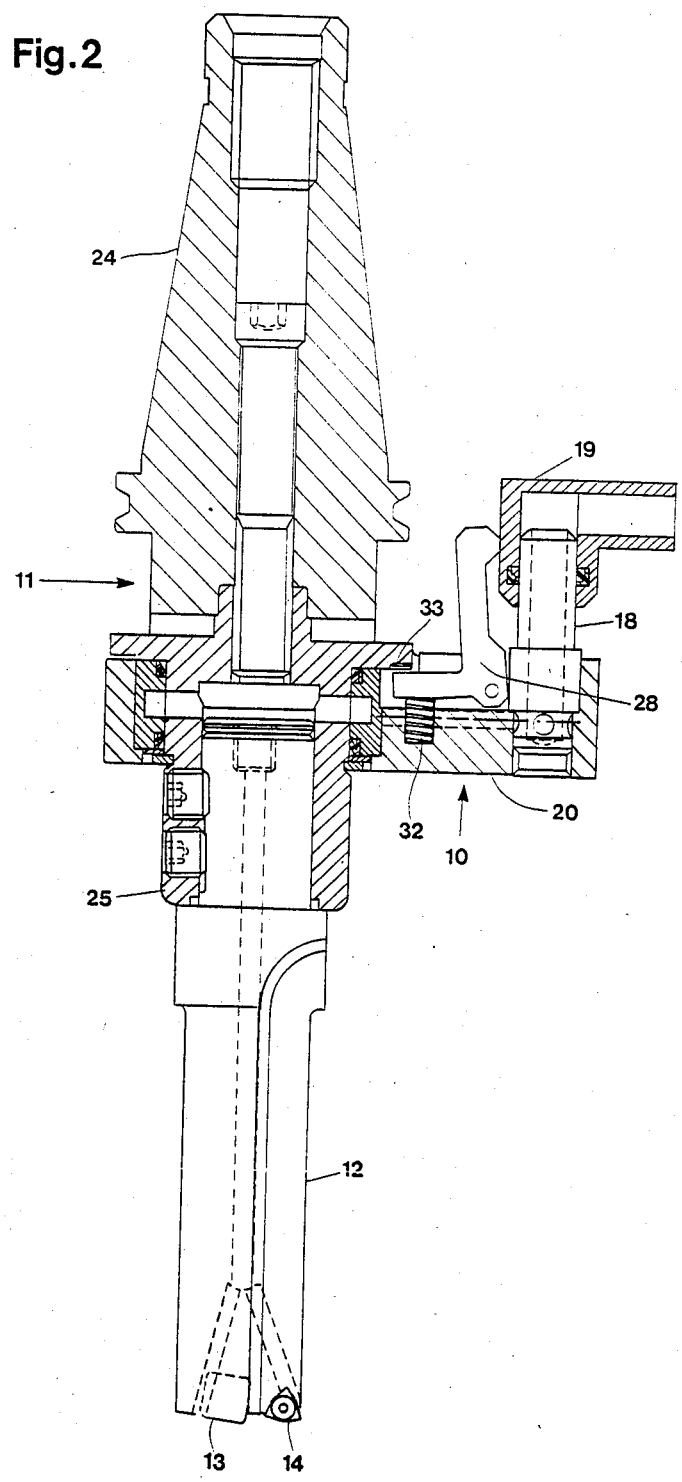

FIG. 2 shows the device in FIG. 1 being connected to the fluid source.

In FIG. 1 a swivel generally denoted by 10 is mounted on a tool holder 11. The tool holder 11 comprises an arbor 24 and an adapter 25. The arbor 24 is adapted to be connected to a machine spindle by means of a clamping bolt, not shown, which is screwed into the rear portion of a bore 26 traversing through the arbor. The forward portion of the bore 26 receives a clamping bolt 27 by means of which the adapter 25 is clamped to the arbor 24. In a manner known per se a short hole drill 12 is attached to the tool holder 11. The short hole drill 12 is provided with two indexable cutting inserts 13, 14 of cemented carbide, which overlap radially. The drill 12 is intended for drilling short holes in metallic bodies, preferably with a depth ranging up to twice the hole diameter. Cutting fluid for flushing the chips and cooling the cutting surface is supplied through an inner passage 15, which has two openings, one at each of the cutting inserts.

The swivel 10 comprises a housing 20 in which a nipple 18 is attached. During the cutting operation the nipple 18 is adapted to project into a bracket or connecting member 19 mounted on the machine tool, not shown.

The passage 15, then communicates with a fluid source through radial passages 16, 17 in the holder 11, a passage 21 in the housing 20, a passage 22 in the nipple 18 and a passage 23 in the connecting member 19.

In the housing 20 an angular locking means 28 is mounted for pivoting around an axis 29. The locking means 28 comprises a radially extending arm portion 30. The outer portion thereof provides a contact portion 31 which is biassed by means of a spring 32 against the bottom surface in a recess 33 in the adapter 25, thereby ensuring that the adapter 25 and the housing 20 are non-rotatably interconnected.

Primarily, the device according to the invention is intended for use in machine tools having automatized tool changing systems. This means that the housing 20 must be secured in a predetermined position relative to the connecting member 19 during the transportation of the tool holder 11; this required locking function being provided by the locking means 28. When the holder 11 is mounted on the machine spindle then the nipple 18 is pushed into the connecting member 19. The locking means 28 is provided with an axially extending arm portion 34. The outer portion 35 thereof will slide against the outer side of the connecting member 19 when the nipple 18 is pushed thereinto, thereby causing the locking means 28 to swing counter clockwise a limited angle about the axis 29 so that the contact portion 31 leaves the recess 33, thus releasing the holder 11 from the housing 20. The locking means 28 is thus adapted to release the holder 11 from the housing 20 is a radially inwardly directed force is applied thereon, more precisely on the outer portion 35 thereof which thus is moved apart radially from the nipple 18.

Due to the fact that no axially acting forces remain on the swivel 10 when the holder 11 is mounted on the machine spindle no nonuniform loading of the housing 20 occurs. This means that the adapter 25 can be journalled in the housing 20 over a friction bearing which in its turn means that the swivel becomes smaller and lighter than in constructions where roller bearings are required. The two cooperating bearing surfaces of the friction bearing are provided by the outer surface of the adapter 25 and the inner surface of a bushing 36 mounted in the housing 20.

In the illustrated embodiment the tool holder 11 comprises the arbor 24 and the adapter 25. However, the invention might of course be applied in connection with tool holders made in one piece and in connection with tool holders designed for holding other tools for chipforming machining.

I claim:

1. A device for transferring fluid, such as cooling or flushing medium, to a rotary holder for a tool for chipforming machining of workpieces, such as a drill, the device comprising a housing arranged on the holder for rotation relative thereto about an axis of rotation, said housing comprising a first connecting member intended to, in use, be connected to a second connecting member on a machine tool, said second connecting member communicating with a fluid source, first passage means in said housing for connecting the fluid source with second passage means in the holder, said housing being provided with a locking means which is adapted to non-rotatably interconnect the housing and the holder when the first and second connecting members are moved apart and release the holder from the housing for rotation relative thereto about said axis when said first and second connecting members are connected to each other, the improvement wherein the locking means is adapted to release the holder from the housing upon the application of a force on the locking means directed substantially radially with reference to said axis.

2. A device according to claim 1, wherein the locking means is swingable against spring action around an additional which is perpendicular to said first named axis.

3. A device according to claim 2, wherein the locking means comprises a generally radially extending first arm portion and a generally axially extending second arm portion, said first arm portion having a first contact portion intended to cooperate with the holder, and said second arm portion having a second contact portion intended to cooperate with the second connecting member, said second contact portion being adapted to be radially moved away from the first connecting member by the second connecting member when said first and second connecting members are connected to each other.

4. A device according to claim 1, wherein the holder is rotatably journalled in the housing over friction bearing means.

5. A device according to claim 1, wherein the holder comprises an arbor intended to be connected to a machine spindle, an adapter carrying the tool, and a clamping bolt mounted in said arbor and adapted to clamp said adapter to said arbor.

6. A swivel device for transferring fluid, such as cooling or flushing medium, to a rotary tool holder for chip-forming machining of workpieces, such as a drill, comprising a housing which is provided with a first connecting member intended to, in use, be connected to a fluid-conducting second connecting member on a machine tool, said housing carrying means for mounting the housing on the holder for rotation relative to the holder about an axis, said housing being provided with a locking means which is adapted to non-rotatably interconnect the housing and the tool holder when said first and second connecting members are moved apart and release the housing from the tool holder for rotation relative thereto about said axis when said first and second connecting members are connected to each other, the improvement wherein the locking means is swingable against spring action around an additional axis which is perpendicular to said first-named axis.

7. A swivel device according to claim 6, wherein the locking means comprises a generally radially extending first arm portion and a generally axially extending second arm portion, said first arm portion having a first contact portion intended to cooperate with the holder, and said second arm portion having a second contact portion intended to cooperate with the second connecting member, said second contact portion being adapted to be radially moved away from the first connecting member by the second connecting member when said first and second connecting members are connected to each other.

8. A swivel device according to claim 6, wherein the holder comprises an arbor intended to be connected to a machine spindle, an adapter carrying the tool, and a clamping bolt mounted in said arbor and adapted to clamp said adapter to said arbor.

9. A swivel device according to claim 6, including bearing means for rotatably supporting the housing on the holder.

* * * * *